R. W. LAURENCE.
VELOCIPEDE.

No. 178,066. Patented May 30, 1876.

WITNESSES:
C. Neveux
John Goethals

INVENTOR:
R. W. Laurence
BY
Munn
ATTORNEYS.

UNITED STATES PATENT OFFICE.

R. WALCOT LAURENCE, OF NEW YORK, N. Y.

IMPROVEMENT IN VELOCIPEDES.

Specification forming part of Letters Patent No. 178,066, dated May 30, 1876; application filed February 28, 1876.

*To all whom it may concern:*

Be it known that I, R. WALCOT LAURENCE, of the city, county, and State of New York, have invented a new and Improved Velocipede, of which the following is a specification:

The invention consists in mounting the steering-wheel on the reach or a lever pivoted to seat, and arranged in an axle-guide, extended forward to the foot-rest, as hereinafter described.

Figure 1:
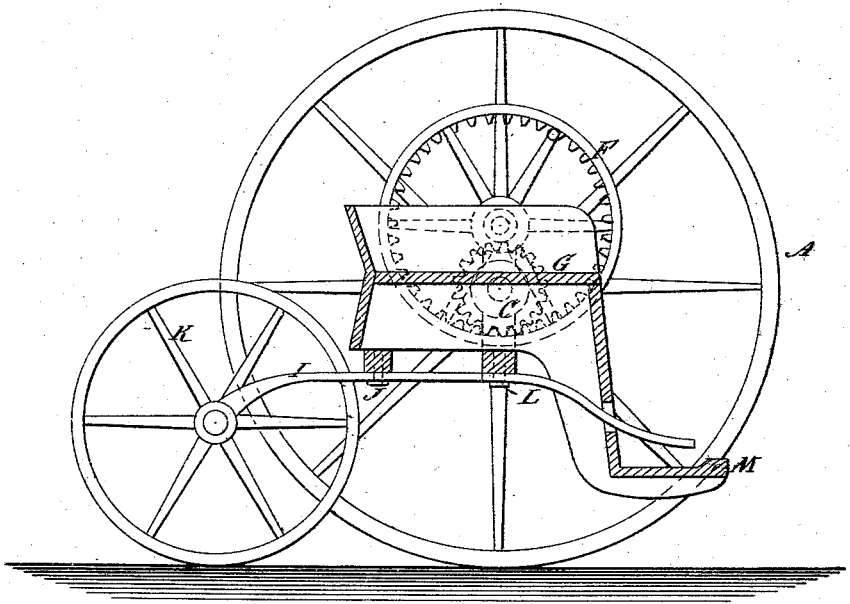
Figure 2:
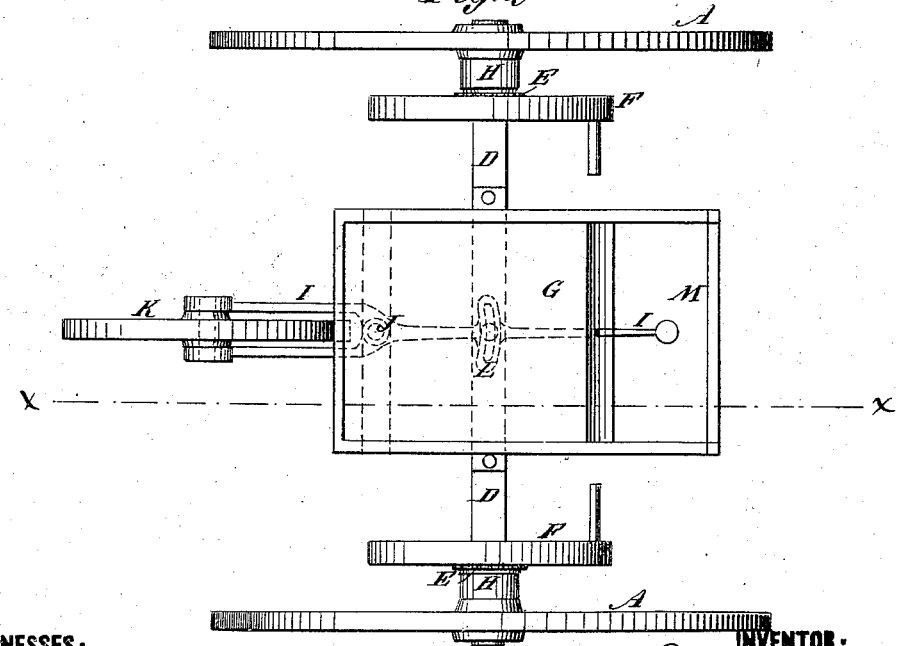

Figure 1 is a longitudinal sectional elevation of my improved velocipede taken on the line $x\ x$, Fig. 2, and Fig. 2 is a plan view.

Similar letters of reference indicate corresponding parts.

A represents the front wheels, which are fitted on short axles B, arranged to turn in the upright portions C of the main axle D, and gearing by a pinion, E, on the inner end with the internally-toothed driving-wheels F, to be worked by the driver sitting in the seat G, and supported in bearings at the top H of the upright portion of the axle. The seat rests on the middle portion of the axle, and also on the forked lever I, to which it is pivoted at J, and which has the hind steering-wheel K pivoted to the rear end, and passes through a guide, L, at the axle, and extends forward to the foot-board M, where it can be worked by the feet to guide the carriage while the propelling power is applied by hand. The carriage can also be guided by the driving-wheels by turning one faster than the other. The connection of the seat to the reach I and guide L prevents the seat from tilting forward or backward.

The arrangement is such that no obstacle exists to entering the seat freely from the front.

Having thus described my invention, I claim as new and desire to secure by Letters Patent—

The steering-wheel K, mounted in the reach or lever I, pivoted to the seat, arranged in the guide L of the axle, and extended to the foot-rest, substantially in the manner described.

R. WALCOT LAURENCE.

Witnesses:
T. B. MOSHER,
ALEX. F. ROBERTS.